US009762629B1

(12) United States Patent

Bhargava et al.

(10) Patent No.: US 9,762,629 B1
(45) Date of Patent: Sep. 12, 2017

(54) CUSTOMIZING CONTENT IN A SOCIAL STREAM

(71) Applicant: Google Inc., Mountain View, CA (US)

(72) Inventors: Aman Bhargava, Santa Clara, CA (US); Abhijit Bose, Paramus, NJ (US); Andrew Ames Bunner, Belmont, CA (US); Lan Liu, Sunnyvale, CA (US); Boris Mazniker, San Francisco, CA (US); Rachel Ida Rosenthal Schutt, New York, NY (US); Andrew Tomkins, San Jose, CA (US); Yonatan Zunger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 676 days.

(21) Appl. No.: 13/693,680

(22) Filed: Dec. 4, 2012

(51) Int. Cl.
*G06F 15/16* (2006.01)
*H04L 29/06* (2006.01)

(52) U.S. Cl.
CPC .................................... *H04L 65/40* (2013.01)

(58) Field of Classification Search
CPC .... G06Q 10/10; H04L 29/06; H04L 29/08072
USPC .......................................................... 709/204
See application file for complete search history.

(56) References Cited

U.S. PATENT DOCUMENTS

| | | | | |
|---|---|---|---|---|
| 2007/0288518 | A1* | 12/2007 | Crigler et al. | 707/104.1 |
| 2009/0327054 | A1* | 12/2009 | Yao | G06Q 10/10 705/12 |
| 2011/0029666 | A1* | 2/2011 | Lopatecki | G06F 15/16 709/224 |
| 2013/0124653 | A1* | 5/2013 | Vick et al. | 709/206 |
| 2013/0151609 | A1* | 6/2013 | Rubinstein | H04L 51/32 709/204 |

* cited by examiner

*Primary Examiner* — Alan S Chou
(74) *Attorney, Agent, or Firm* — Patent Law Works LLP

(57) ABSTRACT

The disclosure includes a system and method for providing a customized stream of content to a user. The system includes: an item sourcer for gathering one or more content items from one or more content sources; a behavior indicator module and scorer for determining one or more behavior scores for the one or more content items; a content indicator module and scorer for determining one or more content scores for the one or more content items; a score combiner for aggregating the one or more behavior scores and the one or more content scores to generate one or more item scores for the one or more content items; a content diversifier for determining one or more diverse items from the one or more content items; and a stream generator for generating a customized stream of content for the user from the one or more diverse items.

27 Claims, 8 Drawing Sheets

CUSTOMIZING CONTENT IN A SOCIAL STREAM

BACKGROUND

The specification relates to customizing content for users.

Over the last decade, social networking has become increasingly popular. A user can consume and interact with various content posted by other users via a social network. For example, a user may consume news or other content items from different online sources and share the content items instantly with other users in a social network. However, numerous content items available in a social network may have varied qualities and some of the content items may be not interesting to a particular user. Therefore, it can be difficult to process the numerous content items that have a variety of diversities including different content types, different locations, different users involved and different qualities, etc., and to provide customized content to a particular user from the numerous content items.

SUMMARY

According to one innovative aspect of the subject matter described in this disclosure, a system for providing a customized stream of content includes a processor and a memory storing instructions that, when executed, cause the system to: gather one or more content items from one or more content sources; determine one or more behavior scores for the one or more content items; determine one or more content scores for the one or more content items; aggregate the one or more behavior scores and the one or more content scores to generate one or more first item scores for the one or more content items; determine one or more diverse items from the one or more content items; and generate a customized stream of content for the user from the one or more diverse items based at least in part on the one or more first item scores.

In general, another innovative aspect of the subject matter described in this disclosure may be embodied in methods that include: gathering one or more content items from one or more content sources; determining one or more behavior scores for the one or more content items; determining one or more content scores for the one or more content items; aggregating the one or more behavior scores and the one or more content scores to generate one or more first item scores for the one or more content items; determining one or more diverse items from the one or more content items; and generating a customized stream of content for the user from the one or more diverse items based at least in part on the one or more first item scores.

Other aspects include corresponding methods, systems, apparatus, and computer program products for these and other innovative aspects.

These and other implementations may each optionally include one or more of the following features. For instance, the operations include: mixing the one or more content items; creating one or more groups of items from the one or more content items based at least in part on one or more content attributes; generating metadata for the one or more content items; and attaching the metadata to the one or more content items.

For instance, the features include: determining, from the one or more first item scores, one or more second item scores related to the one or more diverse items; ranking the one or more diverse items based at least in part on the one or more second item scores; applying a time-decay function to generate one or more current scores for the one or more diverse items; re-ranking the one or more diverse items based at least in part on the one or more current scores; generating the customized stream of content that includes one or more top-ranking diverse items from the one or more diverse items responsive to the re-ranking of the one or more diverse items; determining one or more other users participating in one or more activities related to the one or more content items; determining one or more activity types for the one or more activities; determining one or more first weights for the one or more other users and one or more second weights for the one or more activity types; and generating the one or more behavior scores related to one or more user-activity pairs based at least in part on the one or more first weights and the one or more second weights, each user-activity pair including one of the one or more other users and one of the one or more activity types.

For instance, the features include: determining one or more virality scores for the one or more content items; determining one or more quality scores for the one or more content items; boosting the one or more quality scores based at least in part on reputation of one or more authors of the one or more content items; generating the one or more content scores including the one or more quality scores and the one or more virality scores; identifying one or more activity types related to a first content item from the one or more content item; determining an aggregate number of other users involved in the first content item; aggregating one or more actions related to the first content item based at least in part on the one or more activity types; determining one of the one or more virality scores related to the first content item based at least in part on the aggregate number of other users and the one or more actions related to the first content item; determining one or more authors of the one or more content items; determining one or more topics related to the one or more content items; ranking the one or more content items based at least in part on the one or more item scores; selecting the one or more diverse items from the one or more ranked content items based at least in part on the one or more authors and the one or more topics; the one or more behavior scores and the one or more content scores being time-dependent indicators; and the one or more behavior scores including a group interaction indicator measuring user interaction with content published by one or more members of a group.

The present disclosure may be particularly advantageous in a number of respects. First, the system can incorporate user-level signals (e.g., behavior scores, interactions with a specific group, interactions with a specific user or interactions with a specific activity, etc.) and content-level signals (e.g., content scores, potential click-through rate, virality and/or quality of content items, etc.) for the customization of a stream of content. Second, the system can apply a time-decay function for updating the user-level signals, the content-level signals and/or the stream of content. Third, the system provides a flexible framework for processing content items using different combinations of ranking, filtering, mixing and diversification, etc.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
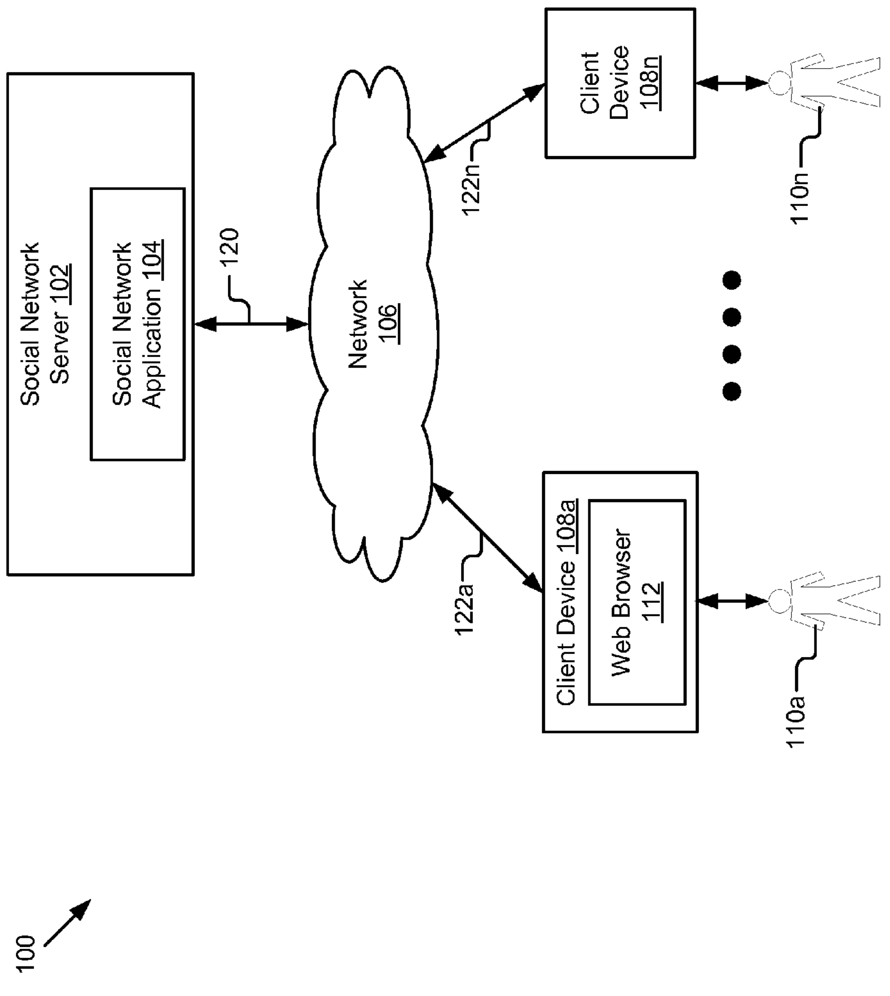
FIG. 1 is a block diagram illustrating an example system for providing a customized stream of content to a user.

FIG. 1 illustrates a block diagram of some implementations of a system 100 for customizing a stream of content for a user. The illustrated system 100 includes a social network server 102 and client devices 108*a*-108*n* (also referred to herein individually and collectively as 108) that can be accessed by users 110*a*-110*n* (also referred to herein individually and collectively as 110). In some instances, the system 100 also includes other servers, e.g., a search server, an advertisement server, a third-party server, a micro blogging server, a web server, a Short Message Service (SMS)/Multimedia Messaging Service (MMS) server and an Instant Messaging (IM) server, etc. In the illustrated implementation, these entities of the system 100 are communicatively coupled via a network 106.

The client devices 108*a*, 108*n* in FIG. 1 are used by way of example. While FIG. 1 illustrates two client devices 108*a* and 108*n*, the present disclosure applies to a system architecture having one or more client devices 108. Furthermore, although FIG. 1 illustrates one network 106 coupled to the client devices 108 and the social network server 102, in practice one or more networks 106 can be connected to these entities.

The social network server 102 can be a hardware server that includes a processor, a memory and network communication capabilities. In the illustrated implementation, the social network server 102 is coupled to the network 106 via signal line 120. In some implementations, the social network server 102 sends and receives data to and from one or more of the client devices 108*a*, 108*n* and other devices/servers via the network 106. The social network server 102 includes a social network application 104. The social network application 104 is described below in more detail with reference to FIG. 2.

The client device 108*a*, 108*n* may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 106. In the illustrated implementation, the client device 108*a* is connected to the network 106 via signal line 122*a*. The user 110*a* interacts with the client device 108*a*. The client device 108*n* is communicatively coupled to the network 106 via signal line 122*n*. The user 110*n* interacts with the client device 108*n*. In some instances, the client device 108*a* includes a web browser 112.

The network 106 can be a conventional type, wired or wireless, and may have numerous different configurations including a star configuration, token ring configuration or other configurations. Furthermore, the network 106 may include a local area network (LAN), a wide area network (WAN) (e.g., the Internet), and/or other interconnected data paths across which multiple devices may communicate. In some instances, the network 106 may be a peer-to-peer network. The network 106 may also be coupled to or include portions of a telecommunications network for sending data in a variety of different communication protocols. In some instances, the network 106 includes Bluetooth® communication networks or a cellular communications network for sending and receiving data including via short messaging service (SMS), multimedia messaging service (MMS), hypertext transfer protocol (HTTP), direct data connection, WAP, email, etc.

Figure 2:
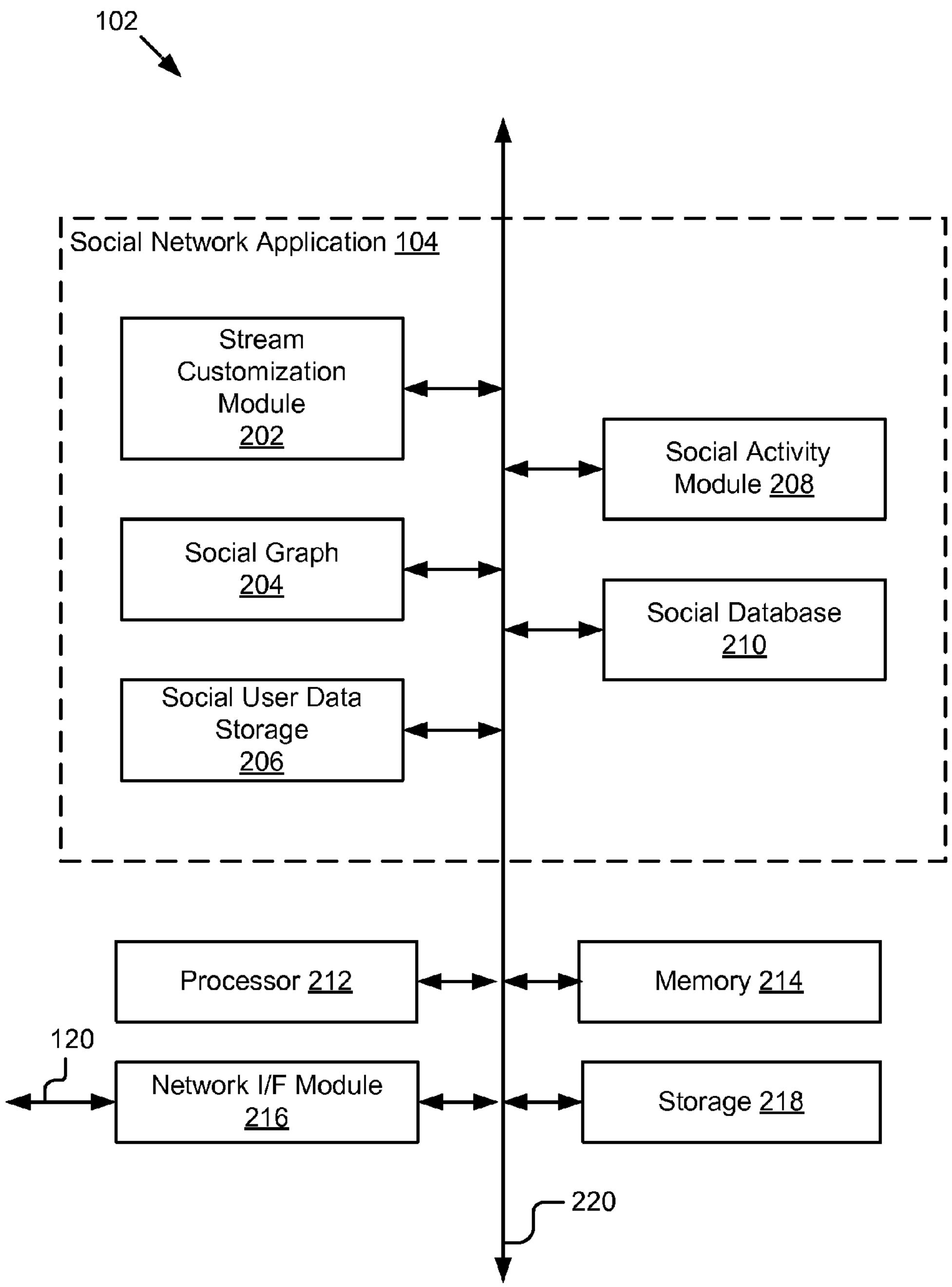
FIG. 2 is a block diagram illustrating an example of a social network application including a stream customization module.

Referring now to FIG. 2, an example of the social network application 104 is shown in more detail. FIG. 2 is a block diagram of a social network server 102 that includes a social network application 104, a processor 212, a memory 214, a network interface (I/F) module 216 and a storage device 218 according to some examples. The components of the social network server 102 are communicatively coupled by a bus 220.

The processor 212 includes an arithmetic logic unit, a microprocessor, a general purpose controller or some other processor array to perform computations and provide electronic display signals to a display device. The processor 212 is coupled to the bus 220 for communication with the other components. Processor 212 processes data signals and may include various computing architectures including a complex instruction set computer (CISC) architecture, a reduced instruction set computer (RISC) architecture, or an architecture implementing a combination of instruction sets. Although FIG. 2 includes a single processor 212, multiple processors 212 may be included. Other processors, operating systems, sensors, displays and physical configurations are possible.

The memory 214 stores instructions and/or data that may be executed by the processor 212. The memory 214 is coupled to the bus 220 for communication with the other components. The instructions and/or data may include code for performing the techniques described herein. The memory 214 may be a dynamic random access memory (DRAM) device, a static random access memory (SRAM) device, flash memory or some other memory device. In some instances, the memory 214 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The network interface module 216 transmits and receives data to and from the client device 108 or other devices/servers. The network interface module 216 is coupled to the network 106 via signal line 120 and also coupled to the bus 220. In some instances, the network interface module 216 includes a port for direct physical connection to the network 106 or to another communication channel. For example, the network interface module 216 includes a USB, SD, CAT-5, or similar port for wired communication with the client device 108. In some instances, the network interface module 216 includes a wireless transceiver for exchanging data with the client device 108 or other communication channels using one or more wireless communication methods, including IEEE 802.11, IEEE 802.16, BLUETOOTH or another suitable wireless communication method.

In some instances, the network interface module 216 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some instances, the network interface module 216 includes a wired port and a wireless transceiver. The network interface module 216 also provides other conventional connections to the network 106 for distribution of files and/or media objects using standard network protocols including TCP/IP, HTTP, HTTPS, and SMTP, etc.

The storage device 218 can be a non-transitory memory that stores data for providing the functionality described herein. The storage device 218 may be a dynamic random access memory (DRAM) device, a static random access memory (SRAM) device, flash memory or some other memory devices. In some instances, the storage device 218 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 218 is communicatively coupled to the bus 220.

In some instances, the storage device 243 stores content data describing one or more content items (e.g., posts, comments, endorsements, messages, articles, photos, videos, audio files, uniform resource locators (URLs), etc.). In some instances, the storage device 243 stores activity data describing activities performed by one or more users upon the consent of the one or more users. Examples of activities include, but are not limited to, publishing a content item, commenting on a content item, providing an endorsement for a content item, sharing a content item, emailing a content item, adding a content item to favorites, replying to a message, playing an online video game, participating in a multi-user communication session, etc. The storage device 218 may store other data for providing the functionality described herein.

In the illustrated implementation shown in FIG. 2, the social network application 104 includes a stream customization module 202, a social graph 204, a social user data storage 206, a social activity module 208 and a social database 210. These components of the social network application 104 are communicatively coupled to each other via the bus 220.

The stream customization module 202 can be software including routines for customizing a stream of content for users. In some instances, the stream customization module 202 can be implemented using hardware including a field-programmable gate array (FPGA) or an application-specific integrated circuit (ASIC). In some instances, the stream customization module 202 can be implemented using a combination of hardware and software. In some instances, the stream customization module 202 may be stored in a combination of the devices and servers, or in one of the devices or servers.

In some instances, the stream customization module 202 gathers one or more content items from various content sources and customizes the one or more content items for a user. The stream customization module 202 is communicatively coupled to the bus 220. The stream customization module 202 is described below in more detail with reference to FIGS. 3-8.

The social graph 204 can reflect a mapping of users and how they can be related in a social network. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph 204 can reflect a mapping of these users and how they can be related. In some instances, the social network server 102 and the social network application 104 may be representative of one social network and there may be multiple social networks coupled to the network 106, each having its own server, application and social graph. For example, a first social network may be more directed to business networking, a second may be more directed to or centered on academics, a third may be more directed to local business, a fourth may be directed to dating and others may be of general interest or a specific focus.

The social user data storage 206 can be a non-transitory memory that stores data for providing the functionality described herein. The social user data storage 206 may be a dynamic random access memory (DRAM) device, a static random access memory (SRAM) device, flash memory or some other memory devices. In some instances, the social user data storage 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation, the social user data storage 206 is communicatively coupled to the bus 220. In some instances, the social user data storage 206 stores data associated with one or more users. For example, the social user data storage 206 stores user profile data (e.g., user names, passwords, email addresses, mailing addresses, interests, hobbies, etc.) associated with one or more users upon the consent of users.

The social activity module 208 can be software including routines for determining one or more social activities performed by one or more users. For example, the social activity module 208 determines that a user has posted a comment on a video and generates activity data describing the user activity. In some instances, the social activity module 208 sends the activity data to the stream customization module 202. In some instances, the social activity module 208 stores the activity data in one or more of the storage 218, the social user data storage 206 and the social database 210.

The social database 210 can include a collection of social data. For example, the social database 210 includes one or more of: activity data describing one or more social activities; content data describing one or more content items; score data describing one or more of behavior scores, content scores and item scores; one or more aggregation rules; one or more diversification rules; and one or more time-decay functions, etc. The behavior scores, content scores, item scores, aggregation rules, diversification rules and time-decay functions are described below in more detail with reference to FIG. 3. In some instances, the social database 210 may include other data for providing the functionality described herein.

Figure 3:
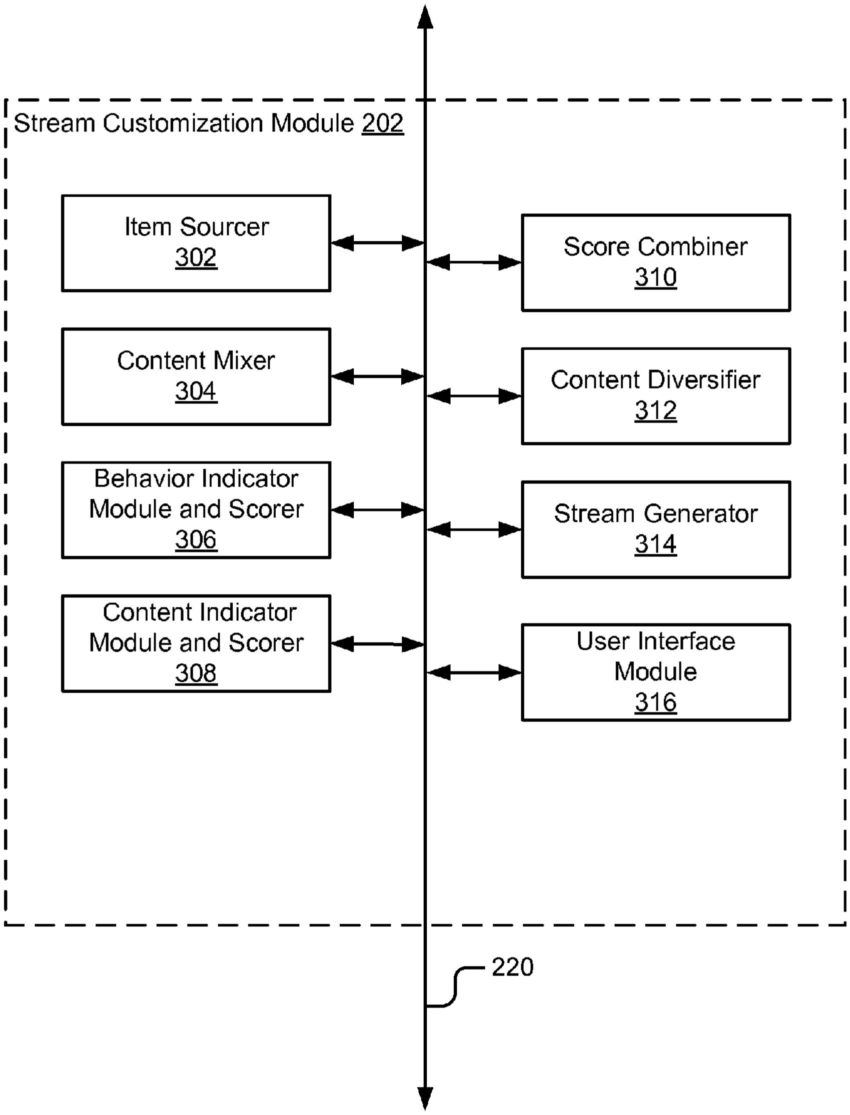
FIG. 3 is a block diagram illustrating an example of a stream customization module.

Referring now to FIG. 3, an example of the stream customization module 202 is shown in more detail. FIG. 3 is a block diagram of a stream customization module 202 that includes an item sourcer 302, a content mixer 304, a behavior indicator module and scorer 306, a content indicator module and scorer 308, a score combiner 310, a content diversifier 312, a stream generator 314 and a user interface module 316 according to some examples. The components of the stream customization module 202 are communicatively coupled by the bus 220.

The item sourcer 302 can be software including routines for gathering content items from various content sources. In some instances, the item sourcer 302 can be a set of instructions executable by the processor 212 to provide the functionality described below for gathering content items from various content sources. In some instances, the item sourcer 302 can be stored in the memory 214 of the social network server 102 and can be accessible and executable by the processor 212. The item sourcer 302 may be adapted for cooperation and communication with the processor 212 and other components of the social network server 102 via the bus 220.

A content source can be a source that provides content items to the item sourcer 302. For example, a content source can be a source that provides one or more of: content posted by other users in a group (e.g., posts from other users that the user follows); content posted by other users that add the user to a group (e.g., posts from other users that follow the user); a news feed or other content items subscribed by the user; and a list of most discussed content items in a network (e.g., top 10 most popular news articles during this week), etc. Other examples of a content source are possible. In some instances, a content source can be provided by one of the social network server 102, a web server, a search server, an advertisement server and other servers, etc.

In some instances, the item sourcer 302 queries a variety of content sources and gathers content data for a user from the variety of content sources. The content data describes content items of interest for a user. For example, the content items can be items that a user may potentially consume. In some implementations, the item sourcer 302 periodically queries a variety of content sources and gathers content items for a user. In some instances, the item sourcer 302 sends content data describing the gathered content items to one or more of the content mixer 304, the behavior indicator module and scorer 306 and the content indicator module and scorer 308. In some instances, the item sourcer 302 stores the content data in one or more of the storage 218 and the social database 210.

The content mixer 304 can be software including routines for mixing content items. In some instances, the content mixer 304 can be a set of instructions executable by the processor 212 to provide the functionality described below for mixing content items. In some instances, the content mixer 304 can be stored in the memory 214 of the social network server 102 and can be accessible and executable by the processor 212. The content mixer 304 may be adapted for cooperation and communication with the processor 212 and other components of the social network server 102 via the bus 220.

In some instances, the content mixer 304 receives one or more content items from the item sourcer 302 and mixes the one or more content items gathered from various content sources. Each of the one or more content items may have one or more content attributes. A content attribute can be a property of a content item. For example, a content attribute for a content item may be a content type of the content item (e.g., photos, videos, game notifications, comments, etc.), a subject or a topic related to the content item (e.g., food, travel, clothing, etc.) or a location related to the content item (e.g., a geographical location, an Internet Protocol address, a URL, etc.), etc. In some instances, the content mixer 304 generates one or more groups of items from the one or more content items based at least in part on one or more content attributes. For example, the content mixer 304 groups the one or more content items based at least in part on one or more content types and generates a first group of items including one or more photo items, a second group of items including one or more video items and a third group of items including one or more game notifications, etc.

In some instances, the content mixer 304 generates metadata for each content item and attaches the metadata to the content item for further processing. The metadata can be considered as an additional content attribute for the content item. For example, the content mixer 304 generates one or more keywords and/or tags for each content item and attaches the one or more keywords and/or tags to the content item. In some instances, the content mixer 304 sends the mixed content items including the metadata to one or more of the behavior indicator module and scorer 306 and the content indicator module and scorer 308. In some instances, the content mixer 304 stores the mixed content items including the metadata in one or more of the storage 218 and the social database 210.

In some instances, the content mixer 304 receives a stream of content from the stream generator 314 and generates metadata for the stream of content. For example, the content mixer 304 generates metadata that includes a stream name and one or more display rules for displaying content items in the stream. For example, the stream of content can be displayed to a user under the stream name and the content items in the stream can be displayed according to the one or more display rules. In some instances, a display rule indicates to display content items based at least in part on content attributes of the content items. For example, a display rule indicates to display a video item with a thumbnail image and a photo item with a predetermined size.

In some instances, the content mixer 304 receives one or more scored content items from the score combiner 310 and mixes the one or more scored content items. A scored content item can be a content item having an item score. The item score is described below in more detail. For example, the content mixer 304 generates one or more groups of items from the one or more scored content items based at least in part on one or more content attributes. In some instances, the content mixer 304 generates metadata for each scored content item and attaches the metadata to the scored content item for further processing.

The behavior indicator module and scorer 306 can be software including routines for generating behavior scores. In some instances, the behavior indicator module and scorer 306 can be a set of instructions executable by the processor 212 to provide the functionality described below for generating behavior scores. In some instances, the behavior indicator module and scorer 306 can be stored in the memory 214 of the social network server 102 and can be accessible and executable by the processor 212. The behavior indicator module and scorer 306 may be adapted for cooperation and communication with the processor 212 and other components of the social network server 102 via the bus 220.

In the description that follows, the behavior indicator module and scorer 306 and the content indicator module and scorer 308 are described in terms of generating scores. The scores can be increased or decreased above or below a threshold based upon different factors. It should be understood that the terms "increasing" and "higher" or similar terms could alternatively be "decreasing" and "lower" or similar terms.

A behavior score associated with a user can be a parameter indicating an interaction behavior of the user. In some implementations, a behavior score can be a behavioral indicator indicating how a user interacts with another user. For example, if a first user interacts with a second user and does not interact with a third user, a first behavior score related to the interaction between the first user and the second user can be greater than a second behavior score related to the interaction between the first user and the third user. In some implementations, a behavior score can be a behavioral indicator indicating how a user interacts with a content type or an activity type. For example, if a user views 90% of video items and 10% of text items in his or her stream, a first behavior score for the user related to video interactions can be greater than a second behavior score for the user related to text interactions. In some implementations, a behavior score may be related to a user-activity pair that involves another user and an activity type. For example, a behavior score related to a user-activity pair indicates an affinity of the user to the other user and the activity type involved in the user-activity pair. Different example approaches to determine a behavior score are described below in more detail.

In some instances, a behavior score can be time-dependent. For example, a behavior score changes over time. In some instances, a behavior score has a value of a Boolean number, a real number or an integer number. In some instances, a behavior score includes a group interaction indicator for a group that measures a user's interaction with content published by other users in the group. For example, a group interaction indicator for a friend group measures how a user consumes and interacts with posts published by the friend group. In another example, a group interaction indicator indicates that a user views at least 50% of the posts published by a friend group. As a user interacts more and more with a group of users or content posted by the group over time, a value for a group interaction indicator related to the group increases over time. Other examples of behavior scores are possible.

In some instances, the behavior indicator module and scorer 306 generates one or more behavior scores for a user from historical interaction data associated with the user. For example, the behavior indicator module and scorer 306 processes data describing historical interactions between a first user and a second user, and generates a behavior score related to the interaction between the first user and the second user for the first user. In another example, the behavior indicator module and scorer 306 processes data describing historical interactions with a content type (e.g., video items) performed by a user, and generates a behavior score related to the interaction of the content type (e.g., video interaction) for the user. Examples of historical interactions include, but are not limited to, historical interactions between the user and other users and/or historical interactions between the user and different content items. In some instances, the behavior indicator module and scorer 306 updates the one or more behavior scores in near real-time based on the user's new interactions with other users and/or content items in his or her stream.

In some instances, the behavior indicator module and scorer 306 forms a behavior vector for a user by including the one or more behavior scores associated with the user in the behavior vector. For example, the behavior indicator module and scorer 306 generates a behavior vector related to a first user that includes: (1) a first behavior score related to an interaction between the first user and a second user; (2) a second behavior score related to an interaction between the first user and a third user; (3) a third behavior score related to an interaction with content items in a first content type (e.g., video items); and (4) a fourth behavior score related to an interaction with content items in a second content type (e.g., photo items), etc. In some instances, a behavior vector may be time-dependent. For example, different behavior scores in the behavior vector can be updated in different time intervals. For example, a first behavior score can be updated according to a first time interval and a second behavior score can be updated according to a second time interval.

In some instances, the behavior indicator module and scorer 306 receives one or more content items gathered for a user from the item sourcer 302, determines one or more activities related to the one or more content items and determines one or more other users involved in the one or more activities. For example, the behavior indicator module and scorer 306 determines one or more other users that comment on, share, email and/or endorse the content items, etc. The behavior indicator module and scorer 306 determines one or more activity types related to the one or more activities. For example, the behavior indicator module and scorer 306 determines the activity types as one or more of publishing a content item, reposting a content item, commenting on a content item, endorsing a content item, sharing a content item, emailing a content item, adding a content item to favorites, replying to a content item, playing a video game, participating in a multi-user communication session, etc.

In some instances, the behavior indicator module and scorer 306 determines one or more weights for the one or more other users involved in the one or more activities. For example, the behavior indicator module and scorer 306 determines one or more weights for the one or more other users based at least in part on closeness or relationship between the user and the other users in a social graph so that a second user close to the user (e.g., a family member of the user) can be assigned with a higher (or lower) weight than a third user not close to the user (e.g., an acquaintance of the user). In another example, the behavior indicator module and scorer 306 determines one or more weights for the one or more other users based at least in part on historical interactions between the user and the one or more other users. If the user has more interactions with a second user than a third user, a higher (or lower) weight can be assigned to the second user. The behavior indicator module and scorer 306 also determines one or more weights for the one or more activity types. For example, the behavior indicator module and scorer 306 may assign a higher (or lower) weight to an activity type of sharing a content item than an activity type of commenting on a content item.

In some instances, the behavior indicator module and scorer 306 generates one or more behavior scores for the user based at least on the weights related to the other users and the weights related to the activity types. Each of the behavior scores may be related to a user-activity pair that involves one of the other users and one of the activity types. For example, the behavior indicator module and scorer 306 applies a score function to determine one or more behavior scores based on weights related to the other users and weights related to the activity types. In some instances, the behavior indicator module and scorer 306 forms a behavior vector that includes one or more behavior scores each related to a different user-activity pair.

For example, assume a first friend of the user posts two content items in a social network. The first content item has been endorsed by a second friend and the second content item has been commented on by a third friend. The behavior indicator module and scorer 306 determines that three other users have participated in the two content items (e.g., the first friend, the second friend and the third friend) and three types of activities have been involved in the two content items (e.g., a posting activity, an endorsing activity and a commenting activity). The behavior indicator module and scorer 306 determines three weights for the three other users and three weights for the three types of activities, respectively. The behavior indicator module and scorer 306 generates: (1) a first behavior score related to a first user-activity pair (e.g., the pair of the first friend and the posting activity) by summing up the weight for the first friend and the weight for the posting activity; (2) a second behavior score related to a second user-activity pair (e.g., the pair of the second friend and the endorsing activity) by summing up the weight for the second friend and the weight for the endorsing activity; and (3) a third behavior score related to a third user-activity pair (e.g., the pair of the third friend and the commenting activity) by summing up the weight for the third friend and the weight for the commenting activity. The behavior indicator module and scorer 306 can form a behavior vector that includes the first, second and third behavior scores.

In some instances, the behavior indicator module and scorer 306 sends the one or more behavior scores or the behavior vector to the score combiner 310 for further processing. In some instances, the behavior indicator module and scorer 306 stores the one or more behavior scores or the behavior vector in one of the storage 218 and the social database 210.

The content indicator module and scorer 308 can be software including routines for generating content scores. In some instances, the content indicator module and scorer 308 can be a set of instructions executable by the processor 212 to provide the functionality described below for generating content scores. In some instances, the content indicator module and scorer 308 can be stored in the memory 214 of the social network server 102 and can be accessible and executable by the processor 212. The content indicator module and scorer 308 may be adapted for cooperation and communication with the processor 212 and other components of the social network server 102 via the bus 220.

In some instances, the content indicator module and scorer 306 receives one or more content items gathered for a user from the item sourcer 302, and determines one or more content scores for each of the one or more content items as described below. A content score associated with a content item can be a parameter indicating an importance of the content item. In some implementations, a content score for a content item can be a content indicator indicating how other users interact with and/or respond to the content item. For example, a content score can be a virality score indicating a virality of a content item within a time window. For example, if a first video item has 10,000 views while a second video item has 1,000 views, a first virality score related to the first video item can be greater than a second virality score related to the second video item. In some implementations, a content score can be a quality score indicating a quality of a content item. In some implementations, a content score can be an author popularity score indicating a popularity of an author of a content item. In some implementations, a content score can be time-dependent. For example, a content score can change over time. In some implementations, a content score has a value of a Boolean number, a real number or an integer number.

In some instances, the content indicator module and scorer 308 identifies a content type for each content item (e.g., a photo, a video, a game notification, etc.). The content indicator module and scorer 308 identifies one or more activity types associated with each content item including, but not limited to, reposting the content item, commenting on the content item, endorsing the content item, sharing the content item, emailing the content item, adding the content item to favorites, replying to the content item, etc. The content indicator module and scorer 308 determines an aggregate number of other users participating in the content item. For example, the content indicator module and scorer 308 determines a total number of users involved in at least one activity related to the content item (e.g., a total number of users that view, repost, comment on, share, endorse, email and/or reply to the content item, etc.).

The content indicator module and scorer 308 aggregates actions associated with the content item according to the activity types. For example, the content indicator module and scorer 308 determines that the content item has 12,345 views, 30 reposts, 2,000 comments, 439 sharings and 178 endorsements, etc. The content indicator module and scorer 308 determines a virality score for the content item based at least in part on the aggregate number of other users and the aggregated number of actions related to the content item. For example, if a first content item has more views and more users involved than a second content item, the content indicator module and scorer 308 generates a higher virality score for the first content item than the second content item. In some instances, the content indicator module and scorer 308 determines a virality score for a content item further based on a potential click-through rate for the content item.

In some instances, the content indicator module and scorer 308 determines a quality score for each of the content items. For example, the content indicator module and scorer 308 measures the quality of the content item and determines a quality score for the content item based on the measurement. In another example, the content indicator module and scorer 308 generates a higher (or lower) quality score for a first content item than a second content item because the first content item includes more detail descriptions (e.g., a combination of text, photos, videos, etc.) than the second content item. The content indicator module and scorer 308 boosts (or reduces) the quality score for the content item based at least in part on a reputation of an author of the content item. For example, the content indicator module and score 308 may increase a quality score for a video item if an author of the video item may be a famous movie director.

In some instances, the content indicator module and scorer 308 determines an author popularity score for each of the content items. For example, the content indicator module and scorer 308 determines an author for the content item and determines an author popularity score for the content item based on a popularity of the author's historical content posted in the past. In some instances, the content indicator module scorer 308 may determine other content scores, e.g., a trending score, for each of the content items. A trending score indicates a trend (e.g., a popularity trend, a widespread trend, etc.) of a content item.

By performing operations similar to those described above, the content indicator module and scorer 308 determines one or more content scores (e.g., a virality score, a quality score, an author popularity score, etc.) for each content item. In some instances, the content indicator module and scorer 308 forms a content vector for each content item by including the one or more content scores associated with the content item in the content vector. For example, the content indicator module and scorer 308 generates a content vector related to a content item that includes: (1) a first content score related to a virality of the content item (e.g., a virality score); (2) a second content score related to a quality of the content item (e.g., a quality score); and (3) a third content score related to an author of the content item (e.g., an author popularity score), etc. In some instances, a content vector may be time-dependent. For example, different content scores in a content vector can be updated in different time intervals.

In some instances, the content indicator module and scorer 308 sends the one or more content scores or the content vector for each content item to the score combiner 310. In some instances, the content indicator module and scorer 308 stores the one or more content scores or the content vector for each content item in one of the storage 218 and the social database 210.

The score combiner 310 can be software including routines for combining content scores and behavior scores to generate item scores for one or more content items. In some instances, the score combiner 310 can be a set of instructions executable by the processor 212 to provide the functionality described below for combining content scores and behavior scores to generate item scores for one or more content items. In some instances, the score combiner 310 can be stored in the memory 214 of the social network server 102 and can be accessible and executable by the processor 212. The score combiner 310 may be adapted for cooperation and communication with the processor 212 and other components of the social network server 102 via the bus 220.

In some instances, the score combiner 310 receives one or more content items from the item sourcer 302 or the content mixer 304, one or more behavior scores (or, one or more behavior vectors) related to the content items from the behavior indicator module and scorer 306 and one or more content scores (or, one or more content vectors) related to the content items from the content indicator module and scorer 308. The score combiner 310 aggregates the one or more behavior scores and/or the one or more content scores to generate an item score for each of the one or more content items. In some implementations, the score combiner 310 specifies one or more aggregation rules for aggregating the behavior scores and the content scores. For example, an aggregation rule indicates that an item score for a content item can be generated by summing up one or more content scores and one or more behavior scores related to the content item with different weights. In another example, an aggregation rule indicates that an item score can be generated as a sum of one or more content scores related to the content item. In yet another example, an aggregation rule indicates that an item score can be a sum of one or more behavior scores related to the content item. Other examples of aggregation rules are possible.

For example, assume a content item posted by a first friend of a user has been endorsed by a second friend of the user. The behavior indicator module and scorer 306 generates a first behavior score related to a first user-activity pair (e.g., the pair of the first friend and the posting activity) and a second behavior score related to a second user-activity pair (e.g., the pair of the second friend and the endorsing activity) as described above. The content indicator module and scorer 308 generates three content scores (e.g., a virality score, a quality score and an author popularity score) for the content item as described above. The score combiner 310 determines an item score for the content item as a sum of the first behavior score, the second behavior score, the virality score, the quality score and the author popularity score.

In some instances, the score combiner 310 sends one or more content items and one or more related item scores to one or more of the content mixer 304 and/or the content diversifier 312. For example, the score combiner 310 ranks the one or more content items according to the corresponding item scores and sends one or more content items having scores above a predefined threshold (e.g., highest top-ranked) to the content diversifier 312. In some instances, the score combiner 310 stores the item scores in one or more of the storage 218 and the social database 210.

The content diversifier 312 can be software including routines for determining a set of diverse items. In some instances, the content diversifier 312 can be a set of instructions executable by the processor 212 to provide the functionality described below for determining a set of diverse items. In some instances, the content diversifier 312 can be stored in the memory 214 of the social network server 102 and can be accessible and executable by the processor 212. The content diversifier 312 may be adapted for cooperation and communication with the processor 212 and other components of the social network server 102 via the bus 220.

In some instances, the content diversifier 312 receives a set of content items and a set of related item scores from the score combiner 310. The content diversifier 312 ranks the set of content items according to the related item scores and determines one or more content items with scores above a predefined threshold (e.g., highest item scores). In some instances, the content diversifier 312 receives the content items with scores above a predefined threshold (e.g., the top-ranking content items with highest item scores) from the score combiner 310.

In some instances, the content diversifier 312 determines a diverse set of content items from the set of content items (or, the set of top-ranking content items) based at least in part on one or more diversification rules. A diversification rule can be a rule for diversifying a set of content items. For example, a diversification rule indicates a maximal number of content items to be selected from a single group. In another example, a diversification rule indicates to select content items according to different topics, subjects and/or authors, etc.

In some instances, the content diversifier 312 determines one or more authors and one or more topics or subjects related to the set of content items (or, the set of top-ranking content items). The content diversifier 312 selects one or more content items from the set of content items (or, the set of top-ranking content items) according to different topics, subjects and/or authors. The selected content items may have diverse topics, subjects and/or authors and form a diverse set of content items. Content items included in the diverse set of content items may be referred to as diverse items herein. In some instances, the content diversifier 312 adds the diverse items to a stream for a user. In some instances, the content diversifier 312 sends the diverse items to the stream generator 312.

The stream generator 314 can be software including routines for generating a stream of content for a user. In some instances, the stream generator 314 can be a set of instructions executable by the processor 212 to provide the functionality described below for generating a stream of content for a user. In some instances, the stream generator 314 can be stored in the memory 214 of the social network server 102 and can be accessible and executable by the processor 212. The stream generator 314 may be adapted for cooperation and communication with the processor 212 and other components of the social network server 102 via the bus 220.

In some instances, the stream generator 314 receives one or more diverse items from the content diversifier 312. The stream generator 314 determines one or more item scores related to the one or more diverse items and ranks the one or more diverse items according to the one or more item scores. The stream generator 314 applies a time-decay function to generate one or more current scores for the one or more diverse items. For example, if a time-decay function indicates that an item score (or, a behavior score, a content score) related to a content item decreases according to a publication duration of the content item (e.g., a time duration from the published time to the current time), the stream generator 314 applies the time-decay function to update the item score (or, the behavior score, the content score) and determines a current score for the content item as the updated item score. The stream generator 314 re-ranks the diverse items according to the current scores related to the diverse items. The stream generator 314 generates a customized stream of content for the user including one or more content items with scores above a predefined threshold (e.g., the top-ranking diverse items with highest current scores).

In some instances, the stream generator 314 updates a customized stream of content for a user when the user logs in to a social network, begins to read the stream of content, refreshes the stream of content and/or posts content in a social network. In some instances, the stream generator 314 updates a customized stream of content for a user periodically. In some instances, the stream generator 314 updates a customized stream of content for a user in real time.

In some instances, the stream generator 314 receives one or more content items and other data from one or more of a content mixer 304, the behavior indicator module and scorer 306, the content indicator module and scorer 308, the score combiner 310 and the content diversifier 312. The stream generator 314 generates customized streams of content for different users using different combinations of output data from the modules 304, 306, 308, 310 and 312. For example, the stream generator 314 receives one or more content items and one or more content scores for each content item from the content indicator module and scorer 308. The stream generator 314 determines an item score for each content item as a sum of the one or more content scores related to the content item so that one or more item scores can be determined for the one or more content items. The stream generator 314 ranks the one or more content items according to the one or more item scores and generates a customized stream of content for a user including one or more top-ranking content items. In another example, the stream generator 314 receives one or more groups of content items classified according to one or more content attributes from the content mixer 304 and generates a customized stream of content for a user including the one or more groups of content items. In yet another example, the stream generator 314 receives one or more content items and one or more item scores from the score combiner 310. The stream generator 314 ranks the one or more content items according to the item scores and generates a customized stream of content for a user including one or more top-ranking content items.

In some instances, the stream generator 314 provides a customized stream of content to a user. For example, the stream generator 314 sends the customized stream of content to the user interface module 316, causing the user interface module 316 to generate graphical data for presenting the customized stream to the user. In some instances, the stream generator 314 sends the customized stream of content to the content mixer 304, causing the content mixer 304 to generate metadata for the stream.

The user interface module 316 can be software including routines for generating graphical data for providing user interfaces to users. In some instances, the user interface module 316 can be a set of instructions executable by the processor 212 to provide the functionality described below for generating graphical data for providing user interfaces to users. In some instances, the user interface module 316 can be stored in the memory 214 of the social network server 102 and can be accessible and executable by the processor 212. The user interface module 316 may be adapted for cooperation and communication with the processor 212 and other components of the social network server 102 via the bus 220.

In some instances, the user interface module 316 generates graphical data for providing a user interface that depicts a customized stream of content. The user interface module 316 sends the graphical data to a client device 108 operated by a user, causing the client device 108 to present the customized stream of content to the user via the user interface. In some instances, the user interface module 316 may generate graphical data for providing other user interfaces to users.

Figure 4:
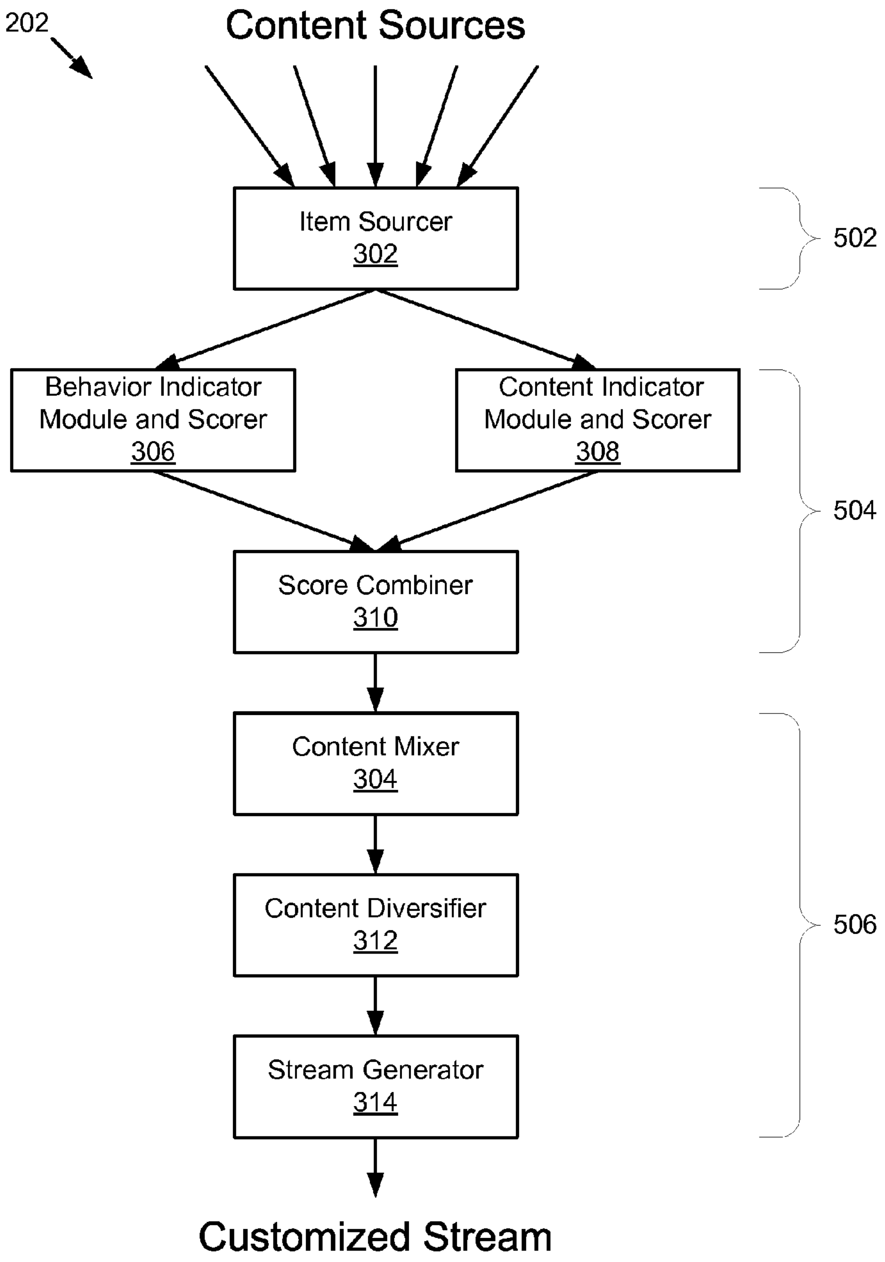
FIG. 4 is a block diagram illustrating another example of a stream customization module.

Referring now to FIG. 4, another example of a stream customization module 202 is shown. In some implementations, the item sourcer 302 gathers various content items for a user from a variety of content sources. The item sourcer 302 sends the various content items to the behavior indicator module and scorer 306 and the content indicator module and scorer 308, respectively. The behavior indicator module and scorer 306 generates one or more behavior scores related to the various content items. For example, the behavior indicator module and scorer 306 determines one or more other users participating in activities related to the various content items and one or more activity types for the activities. The behavior indicator module and scorer 306 generates a behavior score for each user-activity pair involving one of the other users and one of the activity types. The behavior indicator module and scorer 306 sends the one or more behavior scores to the score combiner 310.

The content indicator module and scorer 308 generates one or more content scores for each of the various content items. The content indicator module and scorer 308 sends the one or more content scores for each of the various content items to the score combiner 310. The score combiner 310 aggregates the behavior scores and the content scores to generate an item score for each of the content items. The score combiner 310 sends the content items and the corresponding item scores to the content mixer 304 and/or the content diversifier 312. The content mixer 304 processes the content items and sends the processed content items to the content diversifier 312. For example, the content mixer 304 generates metadata for the content items. The content diversifier 312 determines a set of diverse items from the content items and sends the set of diverse items to the stream generator 314. The stream generator 314 generates a customized stream of content for the user from the set of diverse items.

Figure 5:
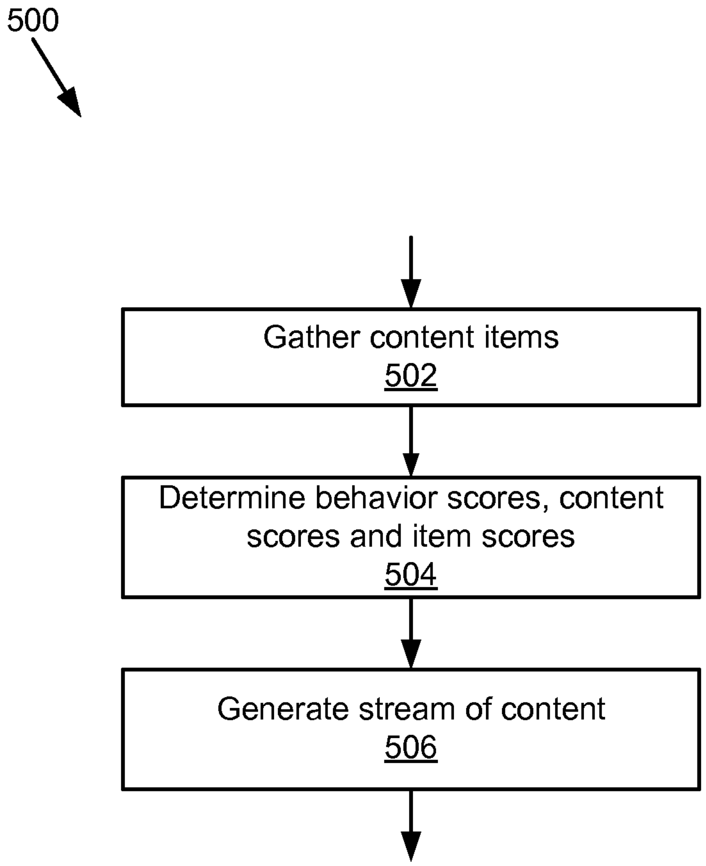
FIG. 5 is a flowchart of an example method for customizing a stream of content for a user.

Referring now to FIG. 5, an example of a method 500 for customizing a stream of content for a user is described. In some instances, the item sourcer 302 gathers 502 one or more content items from one or more content sources. The behavior indicator module and scorer 306 determines 504 one or more behavior scores related to the one or more content items. The content indicator module and scorer 308 determines 504 one or more content scores related to the one or more content items. The score combiner 310 aggregates the one or more behavior scores and the one or more content scores to determine 504 one or more item scores each related to one of the one or more content items. The stream generator 314 generates 506 a stream of content for the user based at least in part on the one or more item scores.

Figure 6:
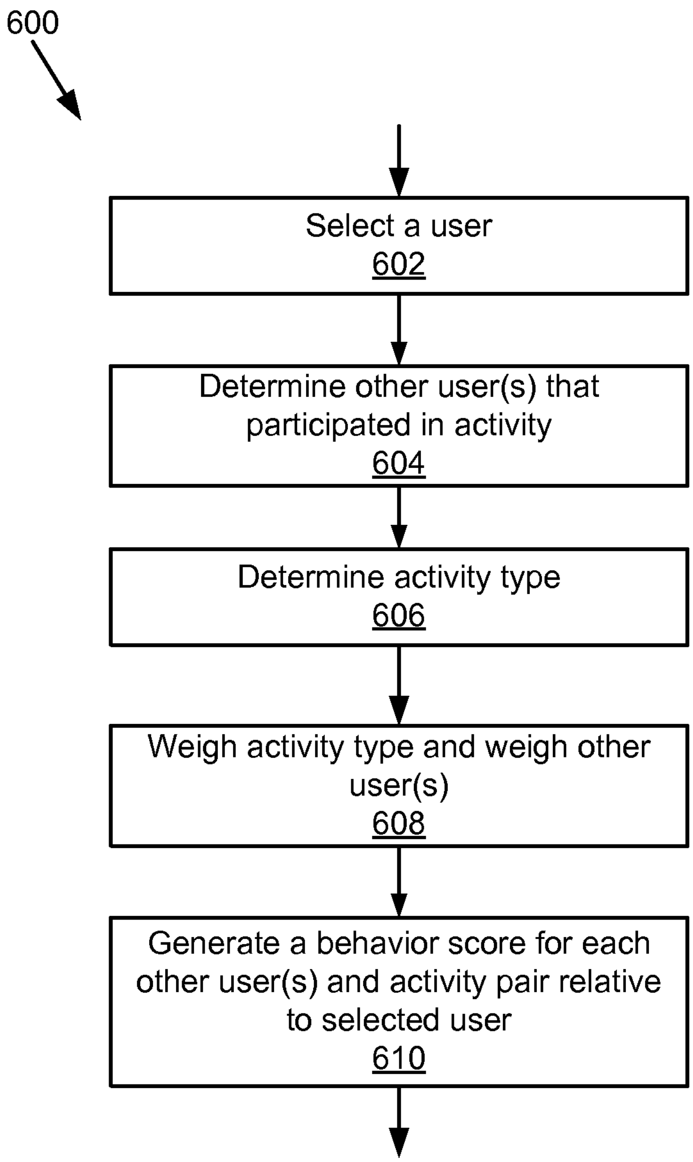
FIG. 6 is a flowchart of an example method for determining one or more behavior scores.

Referring now to FIG. 6, an example of a method 600 for determining one or more behavior scores is described. In some instances, the behavior indicator module and scorer 306 selects 602 a user. The behavior indicator module and scorer 306 receives one or more content items. The behavior indicator module and scorer 306 determines 604 one or more other users that participated in one or more activities related to the one or more content items. The behavior indicator module and scorer 306 determines 606 one or more activity types for the one or more activities. The behavior indicator module and scorer 306 weighs 608 the one or more activity types and weighs 608 the one or more other users. The behavior indicator module and scorer 306 generates 610 a behavior score for each user-activity pair relative to the selected user. A user-activity pair includes one of the other users and one of the activity types.

Figure 7:
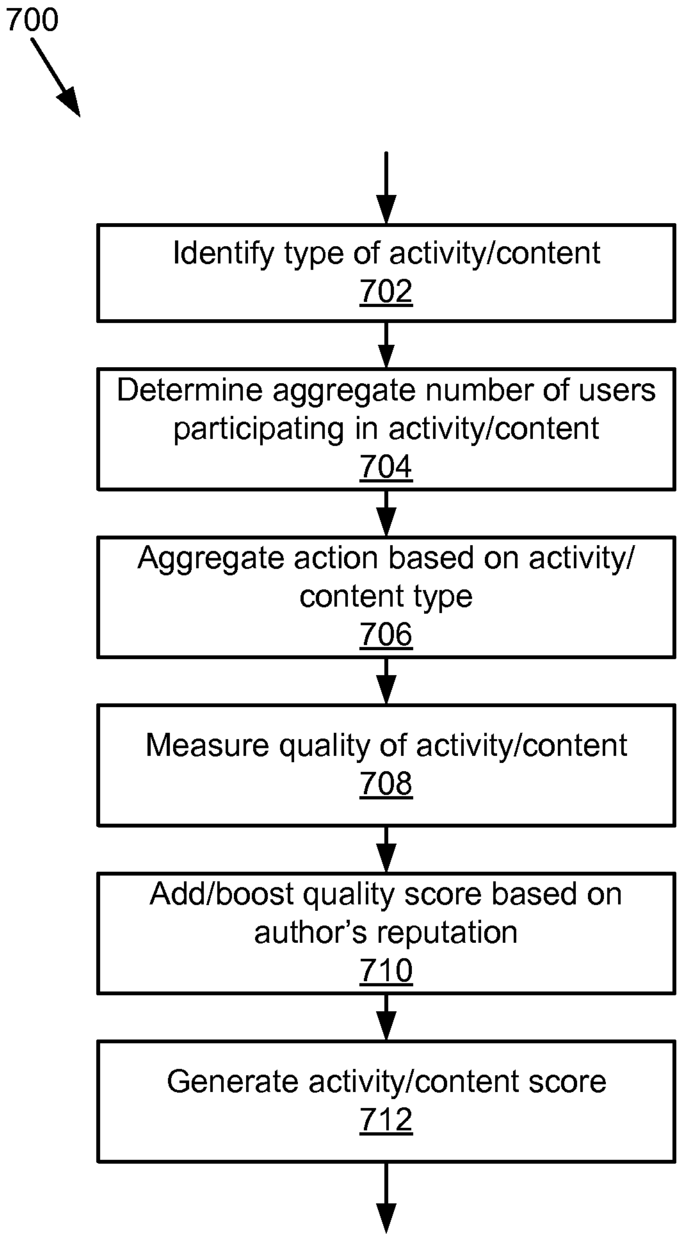
FIG. 7 is a flowchart of an example method for determining one or more content scores.

Referring now to FIG. 7, an example of a method 700 for determining one or more content scores for a content item is described. In some instances, the content indicator module and scorer 308 identifies 702 types of activities and/or a content type related to a content item. The content indicator module and scorer 308 determines 704 an aggregate number of other users participating in the activities. For example, the content indicator module and scorer 308 determines 704 an aggregate number of other users participating in the content item.

The content indicator module and scorer 308 aggregates 706 one or more actions based at least in part on the types of activities. In some instances, the content indicator module and scorer 308 generates a virality score for the content item based at least in part on the aggregate number of users and the aggregate actions. The content indicator module and scorer 308 measures 708 a quality for the content item to generate a quality score. The content indicator module and scorer 308 boosts/adds 710 the quality score based at least in part on a reputation of an author of the content item. The content indicator module and scorer 308 generates 712 one or more content scores for the content item including one or more of the virality score and the quality score, etc.

Figure 8:
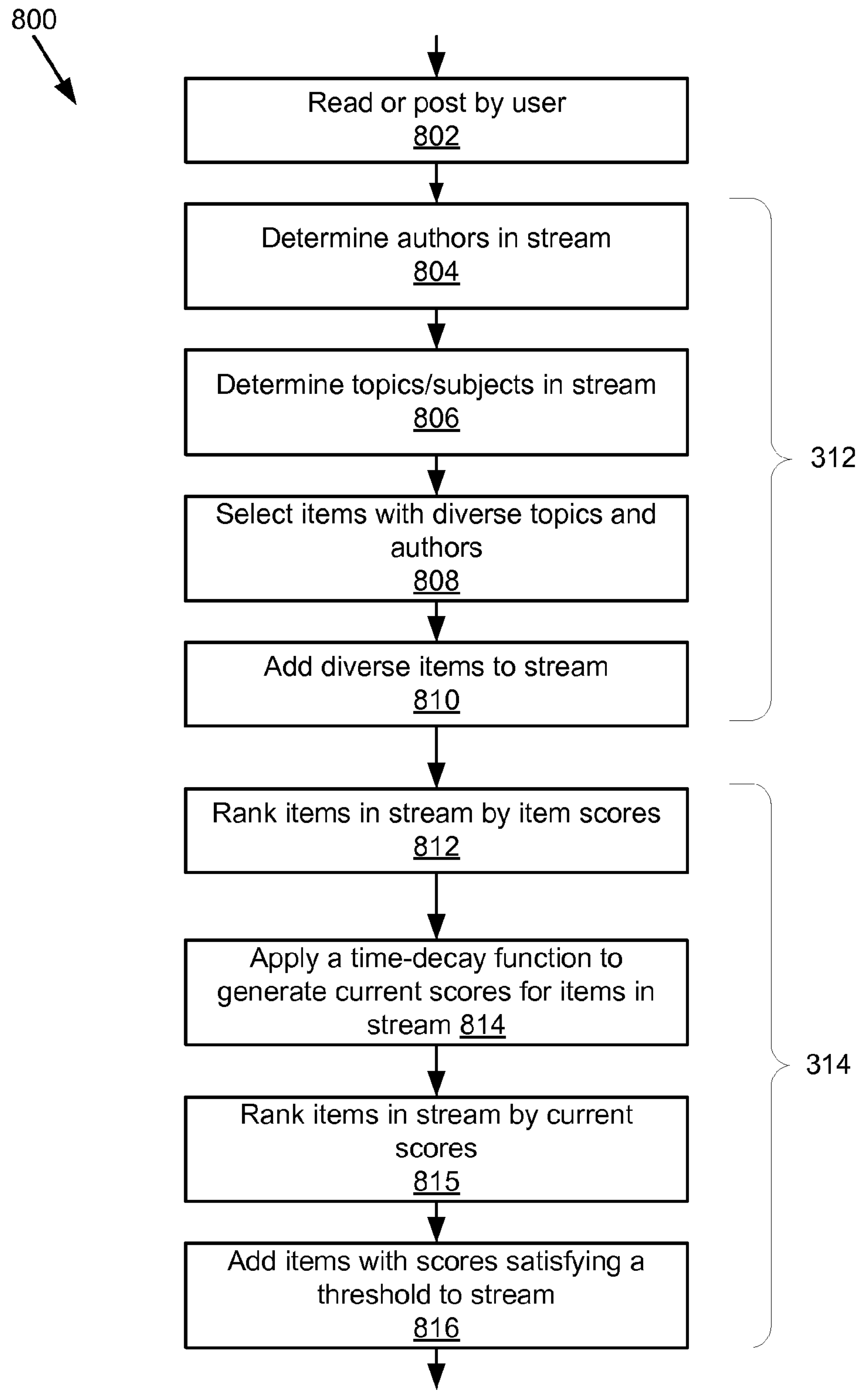
FIG. 8 is a flowchart of an example method for providing a customized stream of content to a user.

Referring now to FIG. 8, an example of a method 800 for providing a customized stream of content is described. In some instances, a stream of content can be read or posted 802 by a user. The content diversifier 312 determines 804 one or more authors in the stream. The content diversifier 312 determines 806 one or more topics or subjects in the stream. The content diversifier 312 selects 808 diverse items with diverse topics, subjects and/or authors from a set of content items received from one or more of the score combiner 310, the content mixer 304, the behavior indicator module and scorer 306 and the content indicator module and scorer 308. The content diversifier 312 adds 810 the diverse items to the stream.

The stream generator 314 ranks 812 the content items in the stream according to the corresponding item scores. The stream generator 314 applies 814 a time-decay function to generate current scores for the content items in the stream. The stream generator 314 ranks 815 the content items according to the current scores for the content items. The stream generator 314 adds 816 the content items that satisfy a threshold to the customized stream for the user. For example, in some embodiments, the stream generator 314 adds 816 the content items higher than a threshold to the customized stream for the user.

In the above description, for purposes of explanation, numerous specific details are set forth in order to provide a thorough understanding of the specification. It will be apparent, however, to one skilled in the art that the disclosure can be practiced without these specific details. In other instances, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:

gathering one or more content items from one or more content sources;

determining a user-activity pair representing a behavior pattern indicating how a user interacts with a second user on an activity;

determining a weight for the second user based on a defined relationship between the user and the second user in a social graph, and historical communications between the user and the second user;

determining a behavior score for the user based on the user-activity pair and the weight, the behavior score indicating interaction behavior of the user;

determining one or more content scores for the one or more content items;

aggregating the behavior score and the one or more content scores to generate one or more first item scores for the one or more content items;

determining one or more diverse items from the one or more content items; and generating a customized stream of content for the user from the one or more diverse items based at least in part on the one or more first item scores.

2. The method of claim 1, wherein generating the customized stream of content from the one or more diverse items comprises:

determining, from the one or more first item scores, one or more second item scores related to the one or more diverse items;

ranking the one or more diverse items based at least in part on the one or more second item scores;

applying a time-decay function to generate one or more current scores for the one or more diverse items;

re-ranking the one or more diverse items based at least in part on the one or more current scores; and generating the customized stream of content that includes one or more top-ranking diverse items from the one or more diverse items responsive to the re-ranking of the one or more diverse items.

3. The method of claim 1, wherein determining the behavior score comprises:

determining one or more other users participating in one or more activities related to the one or more content items;

determining one or more activity types for the one or more activities;

determining one or more first weights for the one or more other users and one or more second weights for the one or more activity types; and generating the behavior score based on the user-activity pair, the user-activity pair based at least in part on the one or more first weights and the one or more second weights, each user-activity pair including one of the one or more other users and one of the one or more activity types.

4. The method of claim 1, wherein determining the one or more content scores for the one or more content items comprises:
determining one or more virality scores for the one or more content items;
determining one or more quality scores for the one or more content items;
boosting the one or more quality scores based at least in part on reputation of one or more authors of the one or more content items; and
generating the one or more content scores including the one or more quality scores and the one or more virality scores.

5. The method of claim 4, wherein determining the one or more virality scores for the one or more content items comprises:
identifying one or more activity types related to a first content item from the one or more content items;
determining an aggregate number of other users involved in the first content item;
aggregating one or more actions related to the first content item based at least in part on the one or more activity types; and
determining one of the one or more virality scores related to the first content item based at least in part on the aggregate number of other users and the one or more actions related to the first content item.

6. The method of claim 1, wherein determining the one or more diverse items from the one or more content items comprises:
determining one or more authors of the one or more content items;
determining one or more topics related to the one or more content items;
ranking the one or more content items based at least in part on the one or more first item scores; and
selecting the one or more diverse items from the one or more ranked content items based at least in part on the one or more authors and the one or more topics.

7. The method of claim 1, further comprising:
mixing the one or more content items;
creating one or more groups of items from the one or more content items based at least in part on one or more content attributes;
generating metadata for the one or more content items; and
attaching the metadata to the one or more content items.

8. The method of claim 1, wherein the behavior score and the one or more content scores are time-dependent indicators.

9. The method of claim 1, wherein the behavior score includes a group interaction indicator measuring user interaction with content published by one or more members of a group.

10. A computer program product comprising a non-transitory computer usable medium including a computer readable program, wherein the computer readable program when executed on a computer causes the computer to:
gather one or more content items from one or more content sources;
determine a user-activity pair representing a behavior pattern indicating how a user interacts with a second user on an activity;
determine a weight for the second user based on a defined relationship between the user and the second user in a social graph, and historical communications between the user and the second user;
determine a behavior score for the user based on the user-activity pair and the weight, the behavior scores indicating interaction behavior of the user;
determine one or more content scores for the one or more content items;
aggregate the behavior score and the one or more content scores to generate one or more first item scores for the one or more content items;
determine one or more diverse items from the one or more content items; and
generate a customized stream of content for the user from the one or more diverse items based at least in part on the one or more first item scores.

11. The computer program product of claim 10, wherein generating the customized stream of content from the one or more diverse items comprises:
determining, from the one or more first item scores, one or more second item scores related to the one or more diverse items;
ranking the one or more diverse items based at least in part on the one or more second item scores;
applying a time-decay function to generate one or more current scores for the one or more diverse items;
re-ranking the one or more diverse items based at least in part on the one or more current scores; and
generating the customized stream of content that includes one or more top-ranking diverse items from the one or more diverse items responsive to the re-ranking of the one or more diverse items.

12. The computer program product of claim 10, wherein determining the behavior score comprises:
determining one or more other users participating in one or more activities related to the one or more content items;
determining one or more activity types for the one or more activities;
determining one or more first weights for the one or more other users and one or more second weights for the one or more activity types; and
generating the behavior score based on the user-activity pair, the user-activity pair based at least in part on the one or more first weights and the one or more second weights, each user-activity pair including one of the one or more other users and one of the one or more activity types.

13. The computer program product of claim 10, wherein determining the one or more content scores for the one or more content items comprises:
determining one or more virality scores for the one or more content items;
determining one or more quality scores for the one or more content items;
boosting the one or more quality scores based at least in part on reputation of one or more authors of the one or more content items; and
generating the one or more content scores including the one or more quality scores and the one or more virality scores.

14. The computer program product of claim 13, wherein determining the one or more virality scores for the one or more content items comprises:

identifying one or more activity types related to a first content item from the one or more content items;

determining an aggregate number of other users involved in the first content item;

aggregating one or more actions related to the first content item based at least in part on the one or more activity types; and determining one of the one or more virality scores related to the first content item based at least in part on the aggregate number of other users and the one or more actions related to the first content item.

15. The computer program product of claim 10, wherein determining the one or more diverse items from the one or more content items comprises:

determining one or more authors of the one or more content items;

determining one or more topics related to the one or more content items;

ranking the one or more content items based at least in part on the one or more first item scores; and selecting the one or more diverse items from the one or more ranked content items based at least in part on the one or more authors and the one or more topics.

16. The computer program product of claim 10, wherein the computer readable program when executed on the computer causes the computer to also:

mix the one or more content items;

create one or more groups of items from the one or more content items based at least in part on one or more content attributes;

generate metadata for the one or more content items; and attach the metadata to the one or more content items.

17. The computer program product of claim 10, wherein the behavior score and the one or more content scores are time-dependent indicators.

18. The computer program product of claim 10, wherein the behavior score includes a group interaction indicator measuring user interaction with content published by one or more members of a group.

19. A system comprising:

a processor; and a memory storing instructions that, when executed, cause the system to:

gather one or more content items from one or more content sources;

determine a user-activity pair representing a be behavior pattern indicating how a user interacts with a second user on an activity;

determine a weight for the second user based on a defined relationship between the user and the second user in a social graph, and historical communications between the user and the second user;

determine a behavior score for the user based on the user-activity pair and the weight, the behavior scores indicating interaction behavior of the user;

determine one or more content scores for the one or more content items;

aggregate the behavior score and the one or more content scores to generate one or more first item scores for the one or more content items;

determine one or more diverse items from the one or more content items; and generate a customized stream of content for the user from the one or more diverse items based at least in part on the one or more first item scores.

20. The system of claim 19, wherein the instructions when executed cause the system to generate the customized stream of content from the one or more diverse items by:

determining, from the one or more first item scores, one or more second item scores related to the one or more diverse items;

ranking the one or more diverse items based at least in part on the one or more second item scores;

applying a time-decay function to generate one or more current scores for the one or more diverse items;

re-ranking the one or more diverse items based at least in part on the one or more current scores; and generating the customized stream of content that includes one or more top-ranking diverse items from the one or more diverse items responsive to the re-ranking of the one or more diverse items.

21. The system of claim 19, wherein the instructions when executed cause the system to determine the behavior score by:

determining one or more other users participating in one or more activities related to the one or more content items;

determining one or more activity types for the one or more activities;

determining one or more first weights for the one or more other users and one or more second weights for the one or more activity types; and generating the behavior score based on the user-activity pair, the user-activity pair based at least in part on the one or more first weights and the one or more second weights, each user-activity pair including one of the one or more other users and one of the one or more activity types.

22. The system of claim 19, wherein the instructions when executed cause the system to determine the one or more content scores for the one or more content items by:

determining one or more virality scores for the one or more content items;

determining one or more quality scores for the one or more content items;

boosting the one or more quality scores based at least in part on reputation of one or more authors of the one or more content items; and generating the one or more content scores including the one or more quality scores and the one or more virality scores.

23. The system of claim 22, wherein the instructions when executed cause the system to determine the one or more virality scores for the one or more content items by:

identifying one or more activity types related to a first content item from the one or more content items;

determining an aggregate number of other users involved in the first content item;

aggregating one or more actions related to the first content item based at least in part on the one or more activity types; and determining one of the one or more virality scores related to the first content item based at least in part on the aggregate number of other users and the one or more actions related to the first content item.

24. The system of claim 19, wherein the instructions when executed cause the system to determine the one or more diverse items from the one or more content items by:

determining one or more authors of the one or more content items;

determining one or more topics related to the one or more content items;

ranking the one or more content items based at least in part on the one or more first item scores; and selecting the one or more diverse items from the one or more ranked content items based at least in part on the one or more authors and the one or more topics.

25. The system of claim 19, wherein the instructions when executed cause the system to also:

mix the one or more content items;

create one or more groups of items from the one or more content items based at least in part on one or more content attributes;

generate metadata for the one or more content items; and attach the metadata to the one or more content items.

26. The system of claim 19, wherein the behavior score and the one or more content scores are time-dependent indicators.

27. The system of claim 19, wherein the behavior score includes a group interaction indicator measuring user interaction with content published by one or more members of a group.

* * * * *

UNITED STATES PATENT AND TRADEMARK OFFICE
CERTIFICATE OF CORRECTION

PATENT NO. : 9,762,629 B1
APPLICATION NO. : 13/693680
DATED : September 12, 2017
INVENTOR(S) : Aman Bhargava et al.

It is certified that error appears in the above-identified patent and that said Letters Patent is hereby corrected as shown below:

In the Claims

In Column 23, Line 51, Claim 19 please delete “be”

Signed and Sealed this
Seventh Day of November, 2017

Joseph Matal
*Performing the Functions and Duties of the*
*Under Secretary of Commerce for Intellectual Property and*
*Director of the United States Patent and Trademark Office*